US012288530B2

(12) United States Patent
Ran et al.

(10) Patent No.: US 12,288,530 B2
(45) Date of Patent: Apr. 29, 2025

(54) DISPLAY PANEL AND DISPLAY DEVICE

(71) Applicant: HKC CORPORATION LIMITED, Shenzhen (CN)

(72) Inventors: Ruidi Ran, Guangdong (CN); Luhong Zhou, Guangdong (CN); Junfeng Xie, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/672,074

(22) Filed: May 23, 2024

(65) Prior Publication Data

US 2025/0014526 A1 Jan. 9, 2025

(30) Foreign Application Priority Data

Jul. 7, 2023 (CN) ........................ 202310826675.0

(51) Int. Cl.
*G09G 3/34* (2006.01)

(52) U.S. Cl.
CPC ... *G09G 3/3406* (2013.01); *G09G 2310/0294* (2013.01); *G09G 2320/041* (2013.01);
(Continued)

(58) Field of Classification Search
CPC ......... G09G 3/3406; G09G 2310/0294; G09G 2320/041; G09G 2320/0626;
(Continued)

(56) References Cited

U.S. PATENT DOCUMENTS

2007/0109246 A1 5/2007 Tanaka et al.
2015/0257232 A1* 9/2015 Kimura ............ G02F 1/133603 349/61

(Continued)

FOREIGN PATENT DOCUMENTS

CN 1983364 A 6/2007
CN 107274836 A 10/2017

(Continued)

OTHER PUBLICATIONS

Notice of allowance issued in corresponding CN application No. 202310826675.0 dated Aug. 14, 2023.

*Primary Examiner* — Michael A Faragalla
(74) *Attorney, Agent, or Firm* — HAUPTMAN HAM, LLP

(57) ABSTRACT

A display panel and a display device are provided. The display panel includes a circuit board, a first temperature sensor, a control chip, a driver chip, and a second temperature sensor. The first temperature sensor is spade from the circuit board. The first temperature sensor is configured to obtain first temperature information. The control chip is configured to receive the first temperature information, and output a control signal according to the first temperature information and a preset temperature-compensation-curve. The driver chip is configured to output a driving voltage under the control of the control signal. The second temperature sensor is configured to obtain second temperature information. The control chip is configured to compare the second temperature information with a first preset temperature. When the second temperature information deviates from the first preset temperature, the control chip is configured to correct the preset temperature-compensation-curve and obtain a first corrected temperature-compensation-curve.

18 Claims, 5 Drawing Sheets

(52) U.S. Cl.
CPC ............... *G09G 2320/0626* (2013.01); *G09G 2330/045* (2013.01)

(58) Field of Classification Search
CPC ...... G09G 2330/045; G09G 3/20; G09G 3/36; H05B 33/08; F21V 29/70; G06F 3/041; G06F 3/044
See application file for complete search history.

(56) References Cited

U.S. PATENT DOCUMENTS

| | | | | |
|---|---|---|---|---|
| 2018/0059470 | A1 | 3/2018 | Nam et al. | |
| 2018/0067601 | A1* | 3/2018 | Winokur | G06F 3/0414 |
| 2019/0147783 | A1* | 5/2019 | Nam | G09G 3/3266<br>345/55 |
| 2020/0126482 | A1 | 4/2020 | Yang et al. | |
| 2021/0349485 | A1* | 11/2021 | Ng | F24F 11/30 |

FOREIGN PATENT DOCUMENTS

| | | | |
|---|---|---|---|
| CN | 108648704 | A | 10/2018 |
| CN | 108831380 | A | 11/2018 |
| CN | 109616065 | A | 4/2019 |
| JP | 2001028697 | A | 1/2001 |
| JP | 2007093939 | A | 4/2007 |
| WO | 2008105224 | A1 | 9/2008 |

* cited by examiner

DISPLAY PANEL AND DISPLAY DEVICE

CROSS-REFERENCE TO RELATED APPLICATIONS

This application claims priority under 35 U.S.C. § 119 (a) to Chinese Patent Application No. 202310826675.0, filed Jul. 7, 2023, the entire disclosure of which is incorporated herein by reference.

TECHNICAL FIELD

This disclosure relates to the field of display technology, and in particular to a display panel and a display device.

BACKGROUND

Display panels need to be started up and used at different ambient temperatures. However, when ambient conditions are severe, there are higher requirements for driving voltages Vgatehigh (VGH) in the display panel. Due to an influence of the environment, the display panel sometimes cannot be normally started up, and a display image is abnormal.

In an existing display panel, a circuit design with a thermistor (e.g., a Negative Temperature Coefficient (NTC) thermistor) is adopted, which aims to design a temperature compensation curve in accord with a corresponding display panel according to an ambient temperature change. However, although the existing display panel has a corresponding temperature-compensation-curve, which facilitates start-up and use of the display panel at different temperatures, there are still some deviations in the temperature-compensation-curve.

SUMMARY

In a first aspect, a display panel is provided in the present disclosure. The display panel includes a circuit board, a first temperature sensor, a control chip, a driver chip, and a second temperature sensor. The first temperature sensor is spade from the circuit board. The first temperature sensor is configured to detect an ambient temperature change and obtain first temperature information. The control chip is configured to receive the first temperature information, and output a control signal according to the first temperature information and a preset temperature-compensation-curve. The driver chip is configured to output a driving voltage under the control of the control signal. The driving voltage is used for driving the display panel for image display. The second temperature sensor is configured to detect a temperature change of the circuit board and obtain second temperature information. The control chip is configured to compare the second temperature information with a first preset temperature. When the second temperature information deviates from the first preset temperature, the control chip is configured to correct the preset temperature-compensation-curve and obtain a first corrected temperature-compensation-curve. The first corrected temperature-compensation-curve is used for determining compensation values required by the driving voltage at different ambient temperatures.

In a second aspect, a display device is further provided in the present disclosure. The display device includes a housing and the display panel. The display panel includes a circuit board, a first temperature sensor, a control chip, a driver chip, and a second temperature sensor. The first temperature sensor is spade from the circuit board. The first temperature sensor is configured to detect an ambient temperature change and obtain first temperature information. The control chip is configured to receive the first temperature information, and output a control signal according to the first temperature information and a preset temperature-compensation-curve. The driver chip is configured to output a driving voltage under the control of the control signal. The driving voltage is used for driving the display panel for image display. The second temperature sensor is configured to detect a temperature change of the circuit board and obtain second temperature information. The control chip is configured to compare the second temperature information with a first preset temperature. When the second temperature information deviates from the first preset temperature, the control chip is configured to correct the preset temperature-compensation-curve and obtain a first corrected temperature-compensation-curve. The first corrected temperature-compensation-curve is used for determining compensation values required by the driving voltage at different ambient temperatures. The housing is configured to accommodate the display panel.

BRIEF DESCRIPTION OF THE DRAWINGS

To explain technical solutions in implementations of the present disclosure or the related art more clearly, the following will give a brief introduction to accompanying drawings which are needed to be used in description of implementations or the related art. Apparently, the accompanying drawings in the following description are some implementations of the present disclosure. For those of ordinary skill in the art, other accompanying drawings can be obtained according to these accompanying drawings without creative efforts.

DETAILED DESCRIPTION

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

Terms "first", "second", and the like used in the specification, the claims, and the accompany drawings of the present disclosure are used to distinguish different objects rather than describe a particular order. In addition, the terms "comprise", "include", and "have" as well as variations thereof are intended to cover non-exclusive inclusion. For example, a process, a method, a system, a product, or a device including a series of operations or units is not limited to the listed operations or units, it can optionally include other operations or units that are not listed; alternatively, other operations or units inherent to the process, the method, the product, or the device can be included either.

A term "embodiment" or "implementation" referred to herein means that a particular feature, structure, or characteristic described in conjunction with embodiments or implementations may be contained in at least one embodiment of the present disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

Figure 1:
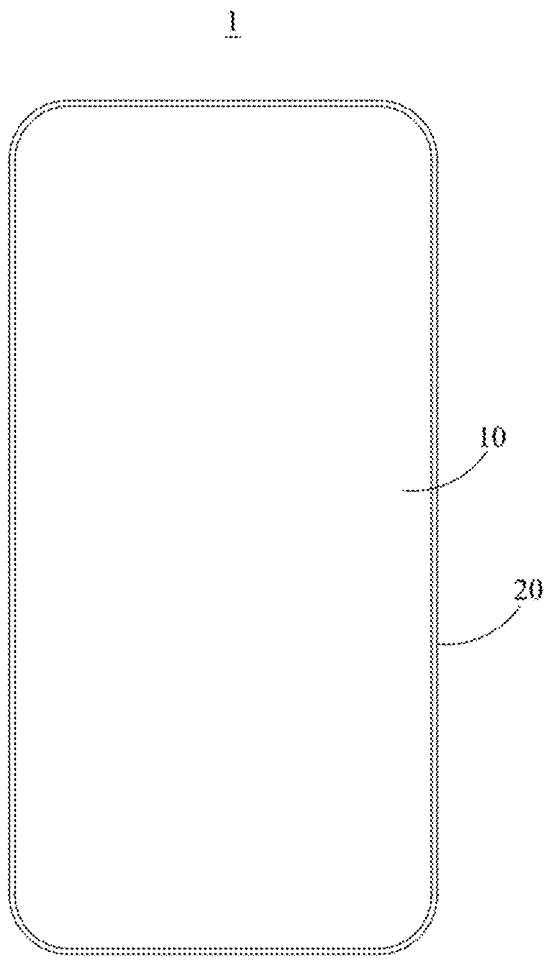
FIG. 1 is a schematic structural view of a display device according to an embodiment of the present disclosure.
Figure 2:
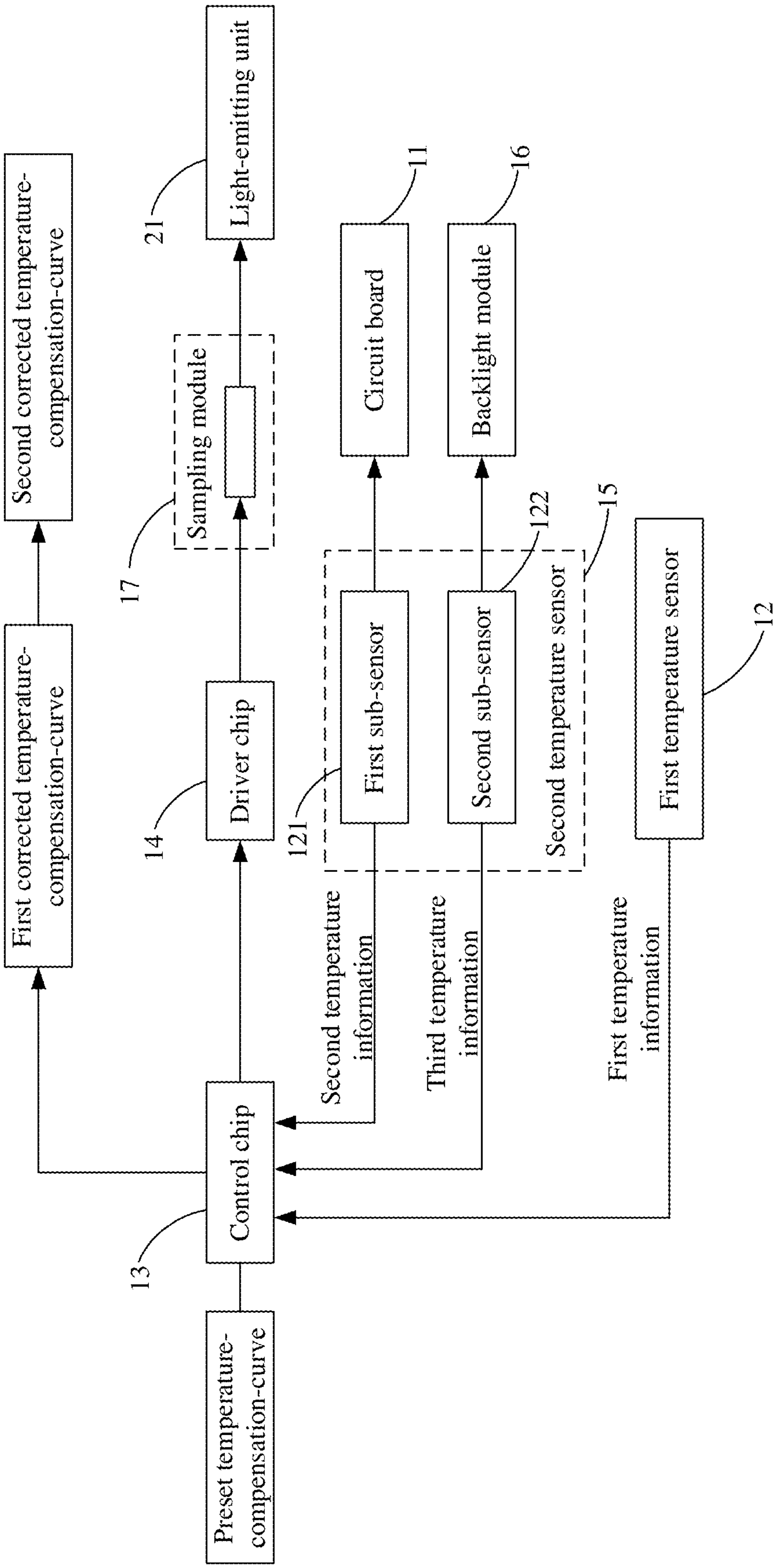
FIG. 2 is a schematic structural view of a circuit structure inside a display panel according to an embodiment of the present disclosure.
Figure 3:
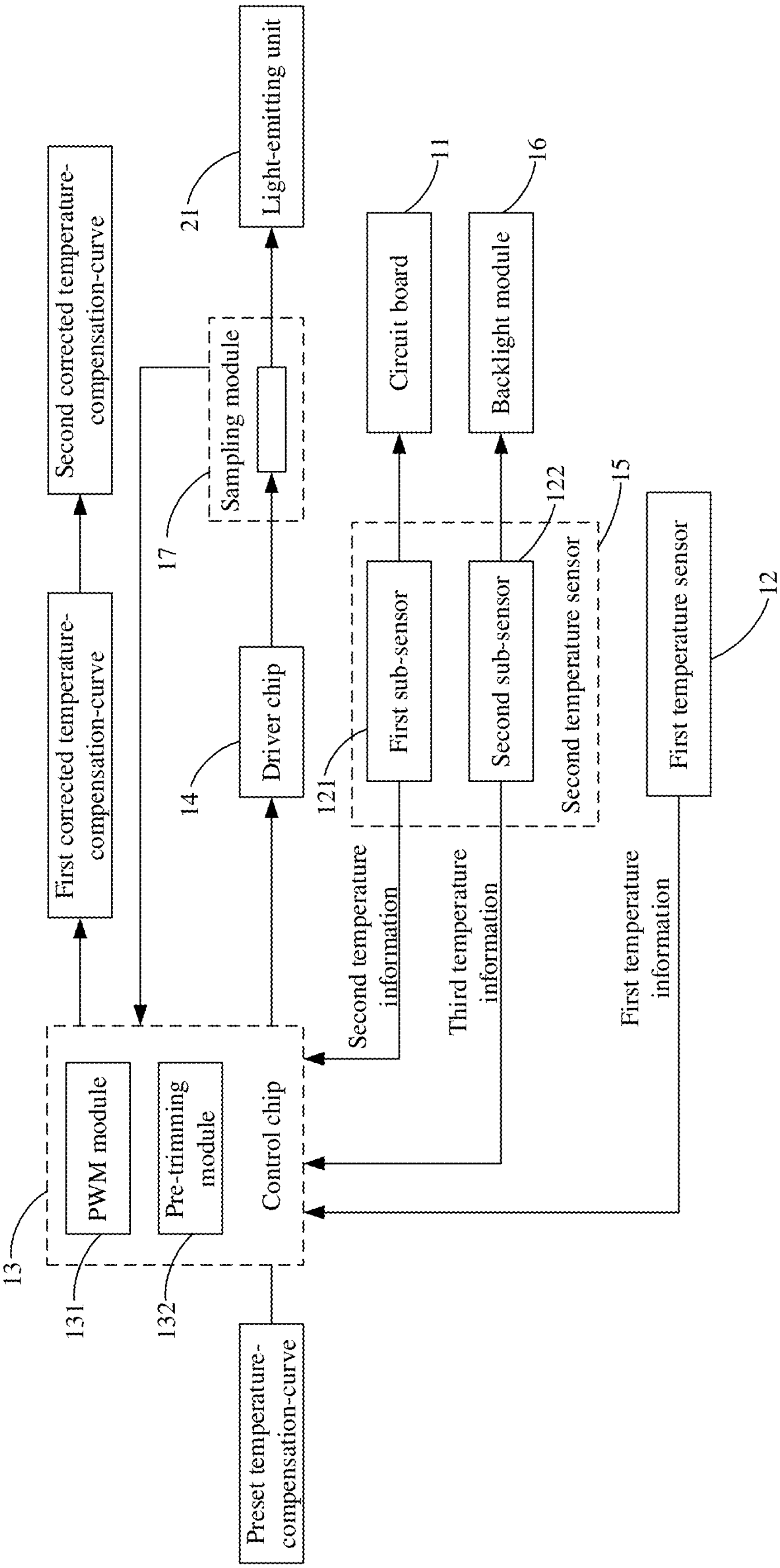
FIG. 3 is a schematic structural view of a circuit structure inside a display panel according to another embodiment of the present disclosure.
Figure 4:
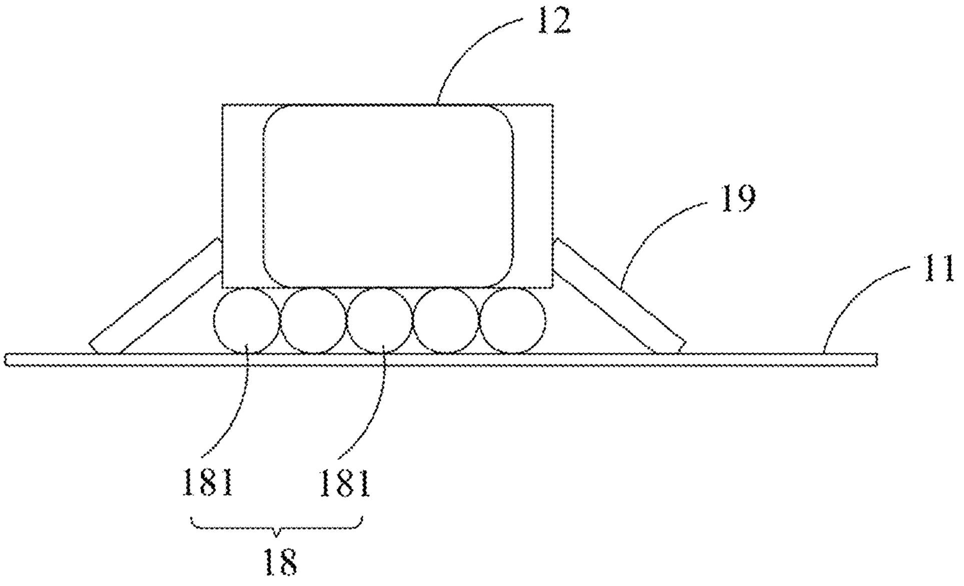
FIG. 4 is a schematic side view of a partial structure of a display panel according to yet another embodiment of the present disclosure.
Figure 7:
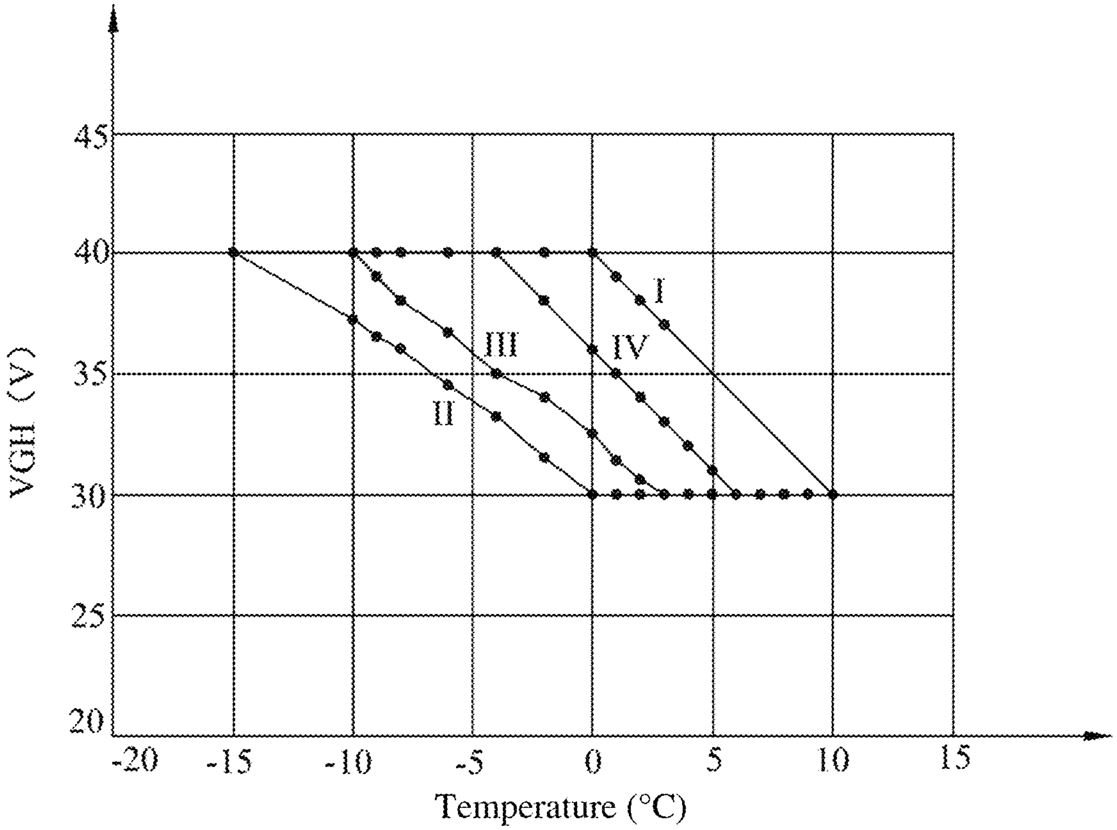
FIG. 7 is a schematic view of correcting a temperature compensation curve of a display panel according to an embodiment of the present disclosure.

Reference can be made to FIG. 1, FIG. 2, FIG. 4, and FIG. 7, where FIG. 1 is a schematic structural view of a display device according to an embodiment of the present disclosure, FIG. 2 is a schematic structural view of a circuit structure inside a display panel according to an embodiment of the present disclosure, FIG. 3 is a schematic structural view of a circuit structure inside a display panel according to another embodiment of the present disclosure, FIG. 4 is a schematic side view of a partial structure of a display panel according to yet another embodiment of the present disclosure, and FIG. 7 is a schematic view of correcting a temperature compensation curve of a display panel according to an embodiment of the present disclosure. A display panel 10 is provided in the present disclosure. The display panel 10 includes a circuit board 11, a first temperature sensor 12, a control chip 13, a driver chip 14, and a second temperature sensor 15. The first temperature sensor 12 is spaced apart from the circuit board 11. The first temperature sensor 12 is configured to detect an ambient temperature change and obtain first temperature information. The control chip 13 is configured to receive the first temperature information, and output a control signal according to the first temperature information and a preset temperature-compensation-curve. The driver chip 14 is configured to output a driving voltage under the control of the control signal. The driving voltage is used for driving the display panel 10 for image display. The second temperature sensor 15 is configured to detect a temperature change of the circuit board 11 and obtain second temperature information. The control chip 13 is configured to compare the second temperature information with a first preset temperature. When the second temperature information deviates from the first preset temperature, the control chip 13 is configured to correct the preset temperature-compensation-curve and obtain a first corrected temperature-compensation-curve. The first corrected temperature-compensation-curve is used for determining compensation values required by the driving voltage at different ambient temperatures.

The display panel 10 may be a liquid crystal display panel of Twisted Nematic (TN) type, Vertical Alignment (VA) type, In-Plane Switching (IPS) type, Advanced Super Dimension Switch (ADS) type, or the like, or may be an Organic Light-Emitting Diode (OLED) display panel, or the like. It can be understood that the function type of the display panel 10 may not be construed as a limitation to the display panel 10 provided in this implementation.

In some implementations of the present disclosure, the display panel 10 may also be a Mini Light-Emitting Diode (LED) display panel.

The circuit board 11 can load different types of electrical signals, such as a high level Vgatehigh (VGH) signal, a low level Vgatelow (VGL) signal, and other signals, to the display panel 10.

Optionally, the first temperature sensor 12 is a thermistor (e.g., a Negative Temperature Coefficient (NTC) thermistor) or other electronic devices capable of sensing temperature. In this implementation, for example, the first temperature sensor 12 is a thermistor. The thermistor can detect an ambient temperature, and a resistance of the thermistor can change with ambient temperature. When the resistance of the thermistor changes, a current signal or a voltage signal of a circuit in which the thermistor is located also changes. Therefore, the control chip 13 calculates the change and obtains the first temperature information according to different electrical signals. In other words, the ambient temperature information of the display panel 10 is obtained.

It can be understood that the first temperature sensor 12 can continuously detect the ambient temperature or detect the ambient temperature at intervals, and a detection time interval of the first temperature sensor 12 can be set according to actual operation requirements of the display panel 10, which is not limited in the present disclosure.

Further, in this implementation, the first temperature sensor 12 is spaced apart from the circuit board 11. Specifically, a heat insulation medium may be disposed between the first temperature sensor 12 and the circuit board 11, or the first temperature sensor 12 is disposed in a hollow portion 112 of the circuit board 11, or other spacing manners may be employed. In the conventional display panel 10, the circuit board 11 is provided with a thermistor, an Integrated Circuit (IC) chip, and the like. When the IC chip operates, more heat is generated, and the temperature of the circuit board 11 also rises under the influence of the heat of the IC chip in the operating state. The temperature rise of the circuit board 11 causes an error in temperature detection of the thermistor, that is, temperature information fed back to the control chip 13 by the thermistor deviates from ambient temperature information. As a result, there is an offset between an actual temperature-compensation-curve (II) of the display panel 10 and an ideal temperature-compensation-curve (I). Reference may be made to temperature-compensation-curves illustrated in FIG. 7, where a coordinate value of the abscissa may be, but is not limited to, an ambient temperature, and a coordinate value of the ordinate may be, but is not limited to, the driving voltage, such as, the VGH. According to the display panel 10 provided in this implementation, the first temperature sensor 12 is spaced apart from the circuit board 11, so that an influence of the board temperature of the circuit board 11 on the first temperature sensor 12 can be greatly reduced in terms of a physical structure, which can also facilitate the heat dissipation of the first temperature sensor 12. Therefore, the ambient temperature that is detected and fed back to the control chip 13 by the first temperature sensor 12 less deviates from the actual ambient temperature. Further, for the display panel 10, a preliminary corrected temperature-compensation-curve (III) of the display panel 10 is closer to the ideal temperature-compensation-curve (I) than the actual temperature-compensation-curve (II).

The control chip 13 is electrically connected to the first temperature sensor 12, and is configured to receive the first temperature information. After receiving the first temperature information, the control chip 13 can call the preset temperature-compensation-curve, and determine a voltage value of the driving voltage required by the display panel 10 corresponding to the first temperature information. After determining the voltage value of the driving voltage, the control chip 13 can output the control signal, and the control signal can be used for controlling the driver chip 14 to output the driving voltage.

Further, the preset temperature-compensation-curve may be, but is not limited to, stored in the control chip 13, or stored in a memory electrically connected to the control chip 13, or called by the control chip 13 in other manners. The preset temperature-compensation-curve is an ideal temperature-compensation-curve designed in advance, and is a curve set according to a turn-on voltage of a Thin Film Transistor (TFT) required for starting up and turning on the display panel 10 at different ambient temperatures. By calling the preset temperature-compensation-curve, the control chip 13 can determine the voltage values of the turn-on voltage required by the display panel 10 at different ambient temperatures, and output a control signal to compensate the turn-on voltage of the display panel 10, thereby assisting the display panel 10 to be normally turned on at different ambient temperatures.

The driver chip 14 is electrically connected to the control chip 13 and is configured to output the driving voltage under the control of the control signal. The driving voltage may be, but is not limited to, a high level VGH signal. The driving voltage can be transmitted to a light-emitting unit 21 of the display panel 10, and is used for controlling the turn-on of the TFT in the display panel 10, so that the display panel 10 displays an image.

The second temperature sensor 15 may be, but is not limited to, an electronic element capable of detecting temperature, such as a NTC thermistor, a Resistance Temperature Detector (RTD), a digital thermometer IC, or the like. The second temperature sensor 15 is configured to detect the temperature change of the circuit board 11 and obtain the second temperature information.

The second temperature sensor 15 may be, but is not limited to, electrically connected to the control chip 13, and feed back the second temperature information to the control chip 13. The control chip 13 is configured to compare the second temperature information with the first preset temperature. When the control chip 13 determines that the second temperature information deviates from the first preset temperature, the control chip 13 is configured to correct the preset temperature-compensation-curve and obtain the first corrected temperature-compensation-curve. Specifically, the control chip 13 is configured to correct the first temperature information fed back by the first temperature sensor 12, so that a driving voltage value output by the driver chip can be corrected. Therefore, the first corrected temperature-compensation-curve (IV) is closer to the ideal temperature-compensation-curve (I) than the preliminary corrected temperature-compensation-curve (III).

Optionally, the first preset temperature may be, but is not limited to, a board temperature of the circuit board 11 in a normal temperature state. Alternatively, the first preset temperature may also be a board temperature of the circuit board 11 in a stable state when operating at different ambient temperatures. Alternatively, the first preset temperature may also be a board temperature of the circuit board 11 when not operating at different ambient temperatures.

For example, in a possible implementation of the present disclosure, for example, the first preset temperature is the board temperature of the circuit board 11 in the normal temperature state. An actual temperature of the environment where the display panel 10 is located is −10° C., and an ambient temperature fed back by the first temperature information under the influence of the board temperature is 0° C. When the circuit board 11 operates at an ambient temperature of −10° C., a board temperature of the circuit board 11 in a stable state is 5° C. A board temperature of the circuit board 11 at the normal temperature is 25° C., that is, the first preset temperature is 25° C. When the first preset temperature deviates from the second temperature information, and the first temperature information also deviates from the normal temperature of 25° C., the control chip 13 can corrects the preset temperature-compensation-curve.

For example, in another possible implementation of the present disclosure, for example, the first preset temperature is the board temperature of the circuit board 11 in the stable state when operating at different ambient temperatures. The actual temperature of the environment where the display panel 10 is located is −10° C., and the ambient temperature fed back by the first temperature information under the influence of the board temperature is 0° C. When the circuit board 11 operates at the ambient temperature of −10° C., the board temperature of the circuit board 11 in the stable state is 5° C., and the board temperature fed back by the second temperature information is 5° C. A theoretical board temperature of the circuit board 11 in the stable state when operating at the ambient temperature of 0° C. is 15° C., that is, the first preset temperature is 15° C. The first preset temperature deviates from the second temperature information. Therefore, the first temperature information is corrected according to the deviation between the first preset temperature and the second temperature information.

Optionally, the correction value of the preset temperature-compensation-curve, that is, the correction value of the temperature information by the control chip 13, may be, but is not limited to be calculated according to a model or a preset program, which is not limited in the present disclosure. Finally, the compensation value for the driving voltage may be corresponding to the actual ambient temperature.

Optionally, the display panel 10 may be configured with VGH compensation values required by the display panel 10 at different ambient temperatures. The control chip 13 can correct the first temperature information, and determine the VGH compensation value according to the determined ambient temperature after correction, so as to obtain the first corrected temperature-compensation-curve.

Further, the control chip 13 is configured to determine the VGH compensation values required by the display panel 10 at different ambient temperatures, that is, determine the compensation values required by the driving voltage at different ambient temperatures, according to the first corrected temperature-compensation-curve and the first temperature information.

For example, in a possible implementation of the present disclosure, the first temperature information detected and fed back to the control chip 13 by the first temperature sensor 12 for the first time is 3° C. The VGH compensation value determined by the control chip 13 by calling the ideal temperature-compensation-curve (I) is 36V. However, the actual ambient temperature is −5° C., and the VGH compensation value actually required by the control chip 13 is supposed to be 40V. As a result, the display panel 10 may be unable to be normally started up due to the insufficient VGH compensation value. After the control chip 13 obtains the first corrected temperature-compensation-curve (IV), it is assumed that the first temperature information detected and fed back to the control chip 13 by the first temperature sensor 12 for the second time is still 3° C. However, after the control chip 13 corrects the first temperature information, the display panel 10 can be turned on and display an image normally according to the design that the VGH compensation value determined by the control chip 13 is 40V or about 40V.

To sum up, in the display panel 10 provided in implementations of the present disclosure, firstly, the first temperature sensor 12 is spaced apart from the circuit board 11, so that the influence of the board temperature of the circuit board 11 on the first temperature sensor 12 is greatly reduced in terms of the physical structure. Therefore, the ambient temperature detected and fed back to the control chip 13 by the first temperature sensor 12 less deviates from the actual ambient temperature. Meanwhile, in the display panel 10, the second temperature sensor 15 is adopted to detect the temperature change of the circuit board 11 and obtain the second temperature information. The second temperature information is compared with the first preset temperature, to correct the preset temperature-compensation-curve and obtain the first corrected temperature-compensation-curve. The first corrected temperature-compensation-curve is used for determining the compensation values required by the driving voltage at different ambient temperatures, to optimize normal start-up and use of the display panel 10 at different ambient temperatures. Therefore, the burnout of the routing in the display panel 10 after the turn-on voltage, that is, the driving voltage, of the TFT in the display panel 10 is kept in a high voltage operating state or the failure of normal start-up at low temperature can be avoided. Further, the offset of the temperature-compensation-curve of the display panel 10 is reduced more effectively, thereby prolonging the service life of the display panel 10 and improving the safety and reliability of the display panel 10.

Referring to FIG. 2 and FIG. 7 again, the display panel 10 further includes a backlight module 16. The second temperature sensor 15 includes a first sub-sensor 121 and a second sub-sensor 122. The first sub-sensor 121 is configured to detect the temperature change of the circuit board 11 and obtain the second temperature information. The second sub-sensor 122 is configured to detect a temperature change of the backlight module 16 and obtain third temperature information. The control chip 13 is configured to compare the third temperature information with a second preset temperature. When the third temperature information deviates from the second preset temperature, the control chip 13 is configured to correct the first corrected temperature-compensation-curve and obtain a second corrected temperature-compensation-curve. The second corrected temperature-compensation-curve is used for determining compensation values required by the driving voltage at different ambient temperatures.

The backlight module 16 may be configured to provide a backlight source. When the display panel 10 displays images with different gray scales, backlight temperatures of the backlight module 16 may be different, which may affect the temperature detection accuracy of the first temperature sensor 12.

The first sub-sensor 121 may be, but is not limited to, an electronic element capable of detecting temperature, such as a NTC thermistor, a RTD, or a digital thermometer IC. The first sub-sensor 121 is configured to detect the temperature change of the circuit board 11 and obtain the second temperature information.

The second sub-sensor 122 may be, but is not limited to, an electronic element capable of detecting temperature, such as a NTC thermistor, a RTD, or a digital thermometer IC. The second sub-sensor 122 is configured to detect the temperature change of the backlight module 16 and obtain the third temperature information.

The second sub-sensor 122 may be, but is not limited to, electrically connected to the control chip 13, and feed back the third temperature information to the control chip 13. The control chip 13 is configured to compare the third temperature information with the second preset temperature. When the control chip 13 determines that the third temperature information deviates from the second preset temperature, the control chip 13 is configured to correct the first corrected temperature-compensation-curve and obtain the second corrected temperature-compensation-curve. Therefore, the second corrected temperature-compensation-curve is closer to the ideal temperature-compensation-curve than the first corrected temperature-compensation-curve.

Optionally, the second preset temperature may be, but not limited to, a board temperature of the backlight module 16 in a normal temperature state. Alternatively, the second preset temperature may also be a board temperature of the backlight module 16 in a stable state when operating at different ambient temperatures. Alternatively, the second preset temperature may also be a board temperature of the backlight module 16 when not operating at different ambient temperatures.

For example, in a possible implementation of the present disclosure, for example, the second preset temperature is the temperature of the backlight module 16 in the normal temperature state. An actual temperature of the environment where the display panel 10 is located is −5° C., and an ambient temperature fed back by the first temperature information under the influence of the backlight module 16 is 10° C. When the backlight module 16 operates at an ambient temperature of −5° C., a board temperature of the backlight module 16 in a stable state is 15° C., and a temperature value of the backlight module 16 fed back by the third temperature information is 15° C. A board temperature of the backlight module 16 at the normal temperature is 25° C., that is, the second preset temperature is 25° C. When the second preset temperature deviates from the third temperature information, and the first temperature information also deviates from the normal temperature of 25° C., the control chip 13 can correct the first corrected temperature-compensation-curve.

For example, in another possible implementation of the present disclosure, for example, the second preset temperature is the temperature of the backlight module 16 in the stable state when operating at different ambient temperatures. The actual temperature of the environment where the display panel 10 is located is −5° C., and the ambient temperature fed back by the first temperature information under the influence of the backlight module 16 is 10° C. When the backlight module 16 operates at the ambient temperature of −5° C., the temperature of the display module 16 in the stable state is 15° C., and the backlight module 16 fed back by the third temperature information is 15° C. When the backlight module 16 operates at the ambient temperature of 10° C., a theoretical temperature value of the backlight module 16 in a stable state is 30° C., that is, the second preset temperature is 30° C. The second preset temperature deviates from the third temperature information. Therefore, the first corrected temperature-compensation-curve can be corrected according to the deviation between the second preset temperature and the third temperature information. In addition, the correction value of the first corrected temperature-compensation-curve, that is, the correction value of the temperature information, by the control chip 13, may be, but is not limited to be calculated according to a model or a preset program, which is not limited in the present disclosure. Finally, the compensation value for the driving voltage may be more corresponding to the actual ambient temperature.

In the display panel 10 provided in this implementation, the temperature of the backlight module 16 is detected. The first corrected temperature-compensation-curve is corrected again. The second corrected temperature-compensation-curve is obtained and used for determining compensation values required by the driving voltage at different ambient temperatures. Therefore, the display panel 10 is compensated more accurately, thereby reducing the offset of the temperature-compensation-curve of the display panel 10 more effectively, and avoiding the burnout of the routing in the display panel 10 or failure of normal start-up at low temperature.

Referring to FIG. 2 and FIG. 7 again, the display panel 10 further includes a sampling module 17. One end of the sampling module 17 is electrically connected to the driver chip 14. The sampling module 17 is configured to detect a magnitude of a driving voltage output by the driver chip 14 and obtain a voltage-signal value. Another end of the sampling module 17 is electrically connected to the control chip 13. The sampling module 17 is configured to feed back the voltage-signal value to the control chip 13. The control chip 13 is configured to obtain the first corrected temperature-compensation-curve according to the voltage-signal value and the preset temperature-compensation-curve.

Specifically, the sampling circuit may be, but is not limited to, a sampling resistor. One end of the sampling circuit is electrically connected to the drive chip 14. The sampling circuit is configured to detect the magnitude of the driving voltage output by the drive chip 14, that is, to collect the VGH output by the drive chip 14. Another end of the sampling circuit is electrically connected to the control chip 13. The sampling circuit is configured to feed back a voltage-signal value of the VGH to the control chip 13. In addition, the sampling module 17 can continuously collect the VGH output by the driver chip 14, or collect the VGH output by the driver chip 14 at set intervals, which is not limited in the present disclosure. In other words, the sampling module 17 can feed back voltage-signal values corresponding to different temperatures to the control chip 13. The control chip 13 may be, but is not limited to, configured to calculate a sampling temperature-compensation-curve according to the voltage-signal values and the first temperature information, and compare the sampling temperature-compensation-curve with the ideal temperature-compensation-curve. For example, for the sampling temperature-compensation-curve, the control chip 13 may select multiple temperature values within a certain temperature range and calculate an average value, and select multiple voltage-signal values and calculate an average value. In addition, for the ideal temperature-compensation-curve, the control chip 13 also selects the same number of temperatures values within the same temperature range and calculates an average value, and selects the same number of voltage-signal values and calculates an average value. The control chip 13 can compare the sampling temperature-compensation-curve with the ideal temperature-compensation-curve. When the difference between average values is too large, the control chip 13 can correct the preset temperature-compensation-curve, and correct the preset temperature-compensation-curve with reference to the collected voltage-signal values, and finally obtain the first corrected temperature-compensation-curve. Therefore, the first corrected temperature-compensation-curve can be close to the ideal temperature-compensation-curve, and the display panel 10 can realize normal turn-on and a good display effect at different temperatures.

Reference can be made to FIG. 3, which is a schematic structural view of a circuit structure inside a display panel according to another embodiment of the present disclosure. The control chip 13 includes a Pulse-Width Modulation (PWM) module 131 and a pre-trimming module 132. The PWM module 131 is configured to adjust display brightness of different frames displayed on the display panel 10. When the display panel 10 displays a first frame, the PWM module 131 is configured to output a first pulse-signal having a first duty ratio. When the display panel 10 displays a second frame, the PWM module 131 is configured to output a second pulse-signal having a second duty ratio. When the PWM module 131 outputs the first pulse-signal, the pre-trimming module 132 is configured to calculate a temperature change of the backlight module 16 and obtain fourth temperature information, and the control chip 13 is configured to compensate the driving voltage according to the fourth temperature information. When the PWM module 131 outputs the second pulse-signal, the pre-trimming module 132 is configured to calculate a temperature change of the backlight module 16 and obtain fifth temperature information, and the control chip 13 is configured to compensate the driving voltage according to the fifth temperature information.

The PWM module 131 may equivalently obtain a waveform of corresponding amplitude and frequency that need to be synthesized by changing the time width of pulse. The PWM module 131 can control display brightness of different frames displayed on the display panel 10 by outputting pulse signals having different duty ratios.

Specifically, in a possible implementation, a gray scale of the display panel 10 when displaying the first frame is different from a gray scale of the display panel 10 when displaying the second frame. When the display panel 10 displays the first frame, the PWM module 131 is configured to output the first pulse-signal having the first duty ratio. When the display panel 10 displays the second frame, the PWM module 131 is configured to output the second pulse-signal having the second duty ratio. Therefore, the display panel 10 can display images with different grayscales.

Further, when the PWM module 131 outputs different pulse signals, the backlight module 16 emits different light intensities, thereby causing the temperature of the backlight module 16 to change accordingly.

Further, in an implementation of the present disclosure, due to the mechanism design of additionally disposing the pre-trimming module 132 in the control chip 13, the control chip 13 can realize the compensation adjustment of the VGH before the temperature of the backlight module 16 changes.

Alternatively, the pre-trimming module 132 may be an algorithm stored in the control chip 13, or a programming, or other pre-trimming mechanism formed for execution by the control chip 13.

When the PWM module 131 outputs the first pulse-signal, the pre-trimming module 132 is configured to calculate the temperature change of the backlight module 16 and obtain the fourth temperature information, before the temperature of the backlight module 16 rises or falls. The fourth temperature information may be equal to or approximately equal to a temperature of the backlight module 16 in a finally stable state where the backlight module 16 performs brightness display after receiving the first pulse-signal. The control chip 13 is configured to compensate the driving voltage, that is, the VGH, in advance, according to the calculated fourth temperature information. Likewise, when the PWM module 131 outputs the second pulse-signal, the pre-trimming module 132 is configured to calculate the temperature change of the backlight module 16 and obtain the fifth temperature information, before the temperature of the backlight module 16 rises or falls. The fifth temperature information may be equal to or approximately equal to a temperature of the backlight module 16 in a finally stable state where the backlight module 16 performs brightness display after receiving the second pulse-signal. The control chip 13 is configured to compensate the driving voltage, that is, the VGH, in advance, according to the calculated fifth temperature information. Likewise, the pre-trimming module 132 can adjust the driving voltage continuously or in a set time condition, before the temperature of the backlight module 16 changes.

Optionally, in other implementations of the present disclosure, the control chip 13 or a memory electrically connected to the control chip 13 may also store temperature information of the backlight module 16 corresponding to different pulse signals in advance. The control chip 13 may invoke the temperature information for matching, and compensate the driving voltage in advance.

Due to the design of additionally disposing the pre-trimming module 132 in the control chip 13, the compensation value for the driving voltage after the pulse signal output by the PWM module changes is calculated in advance. Therefore, the offset of the temperature-compensation-curve caused by the backlight temperature is corrected earlier, so that the second corrected temperature-compensation-curve can be finally fit to the ideal temperature-compensation-curve. In addition, the normal turn-up and use of the display panel 10 at different ambient temperatures is further optimized, thereby greatly prolong the service life of the display panel 10 and greatly improving the safety and reliability of the display panel 10.

Referring to FIG. 4 again, the display panel 10 further includes a heat insulation member 18 and a connecting member 19. The heat insulation member 18 is disposed on the circuit board 11. The first temperature sensor 12 is carried on the heating insulation member 18 at one side of the heat insulation member 18 away from the circuit board 11. The connecting member 19 is disposed at a peripheral side of the heat insulation member 18. One end of the connecting member 19 is electrically connected to the first temperature sensor 12. The other end of the connecting member 19 is electrically connected to the circuit board 11. The connecting member 19 is configured for electrical-signal transmission between the first temperature sensor 12 and the circuit board 11.

Optionally, the heat insulation member 18 may be made of Expanded Polypropylene (EPP) or other materials with good heat insulation performance.

Optionally, the heat insulation member 18 may be, but is not limited to, spherical, ellipsoidal, cylindrical, cuboid, a trapezoidal, or other irregular shapes.

Optionally, the connecting member 19 may be made of a tin-containing material or other materials with good electrical conductivity. The connecting member 19 is disposed at the peripheral side of the heat insulation member 18. In addition, the connecting member 19 may be, but is not limited to, disposed at two opposite sides of the heat insulation member 18, or disposed around four peripheral side surfaces of the heat insulation member 18. One end of the connecting member 19 is electrically connected to the first temperature sensor 12, and the other end of the connecting member 19 is electrically connected to the circuit board 11. The connecting member 19 is configured for the electrical-signal transmission between the first temperature sensor 12 and the circuit board 11.

The heat insulation member 18 may be fixed to the circuit board 11 by, but not limited to, bonding, soldering, or other means. The first temperature sensor 12 is carried on the heat insulation member 18 at the side of the heat insulation member 18 away from the circuit board 11. The first temperature sensor 12 may, but not limited to, face a surface of the heat insulation member 18 away from the circuit board 11. The first temperature sensor 12 is spaced apart from the circuit board 11 through the heat insulation member 18. Due to the heat insulation effect of the heat insulation member 18, the influence of the temperature of the circuit board 11 on the first temperature sensor 12 may be further reduced. Therefore, the influence of the circuit board 11 on the temperature detection accuracy of the first temperature sensor 12 can be greatly reduced in terms of the physical structure, so that the driving voltage can be adapted to requirements of the display panel 10 at different ambient temperatures. Therefore, problems such as the burnout of the routing in the display panel 10 or the failure of normal start-up at low temperature can be effectively solved, thereby improving the safety performance and the use experience of the display panel 10.

Referring to FIG. 4 again, the heat insulation member 18 includes multiple heat insulation sub-members 181. The multiple heat insulation sub-members 181 cooperatively carry the first temperature sensor 12. The multiple heat insulation sub-members 181 abut against each other.

Optionally, the heat insulation sub-member 181 may be, but is not limited to, spherical, ellipsoidal, cylindrical, cuboid, a trapezoidal, or other irregular shapes.

Optionally, the number of the heat insulation sub-members 181 may be, but is not limited to, two, three, four, five, or other numbers.

Optionally, the multiple insulation sub-members 181 may be, but are not limited to, the same or substantially the same in size.

In a preferred implementation of the present disclosure, for example, the heat insulation sub-member 181 is spherical, so as to facilitate heat dissipation of the first temperature sensor 12. In addition, the multiple heat insulation sub-members 181 may be uniformly arranged, so that the first temperature sensor 12 may have a uniform heat insulation and heat dissipation effect.

For the multiple heat insulation sub-members 181, each heat insulation sub-member 181 abuts against the circuit board 11 at one side of each heat insulation sub-member 181. The multiple heat insulation sub-members 181 can be used for jointly carrying the first temperature sensor 12 at the other side of each heat insulation sub-member 181 away from the circuit board 11. The multiple heat insulation sub-members 181 may abut against each other. The multiple heat insulation sub-members 181 may be, but are not limited to, parallel or substantially parallel to each other, so that the first temperature sensor 12 has the uniform heat insulation and heat dissipation effect, thereby ensuring accuracy of the first temperature sensor 12 in sensing the environment.

Figure 5:
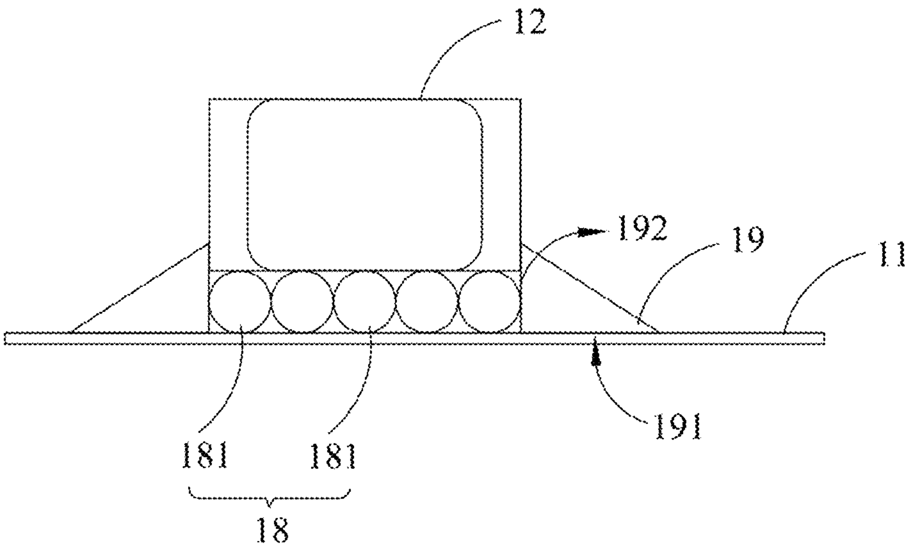
FIG. 5 is a schematic side view of a partial structure of a display panel according to yet another embodiment of the present disclosure.

Reference can be made to FIG. 5, which is a schematic side view of a partial structure of a display panel according to yet another embodiment of the present disclosure. The connecting member 19 has a first connecting surface 191 and a second connecting surface 192 that are connected in a bending manner. The first connecting surface 191 is attached to the circuit board 11. At least part of the second connecting surface 192 is attached to the first temperature sensor 12.

In an implementation of the present disclosure, for example, the connecting member 19 is a cylinder with a triangular cross section. A bending angle between the first connecting surface 191 and the second connecting surface 192 of the connecting member 19 may be, but is not limited to, 90° or approximately 90°.

Further, the first connecting surface 191 is attached to the circuit board 11. The at least part of the second connecting surface 192 is attached to the first temperature sensor 12. The cross section of the connecting member 19 defined by the first connecting surface 191 and the second connecting surface 192 is triangular or approximately triangular. Therefore, the connecting member 19 can support the first temperature sensor 12 more stably, and the manufacturing process of the display panel 10 can be more convenient.

Referring to FIG. 4 and FIG. 5 again, the heat insulation member 18 is made of EPP.

In a preferred implementation of the present disclosure, EPP is used as the material of the heat insulation member 18.

The EPP material, as a composite material, is a high-crystalline polymer/gas composite material with excellent performance. Due to the unique and excellent performance, the EPP material becomes the fastest-growing, environmentally-friendly, novel material for pressure resistance, buffering, and heat insulation at present. In addition, the product made of the EPP material has exceptional shock absorption performance, high recovery rate after deformation, excellent heat resistance (e.g., ranging from −40° C. to 130° C.), chemical resistance, oil resistance, and heat insulation. The product can be 100% recycled with almost no degradation in performance.

Further, the weight of the heat insulation member 18 can be greatly reduced due to the light weight of the EPP material.

Further, due to the advantages of heat resistance and heat insulation of the EPP material, the EPP material is used in combination with the first temperature sensor 12 and the circuit board, that is, the heating insulation member 18 made of the EPP material is disposed between the first temperature sensor 12 and the circuit board 11. Therefore, the influence of the board temperature of the circuit board 11 on the sensing accuracy of the first temperature sensor 12 is effectively reduced, so that the display panel 10 has a large improvement in the accuracy of the temperature compensation of the driving voltage.

Figure 6:
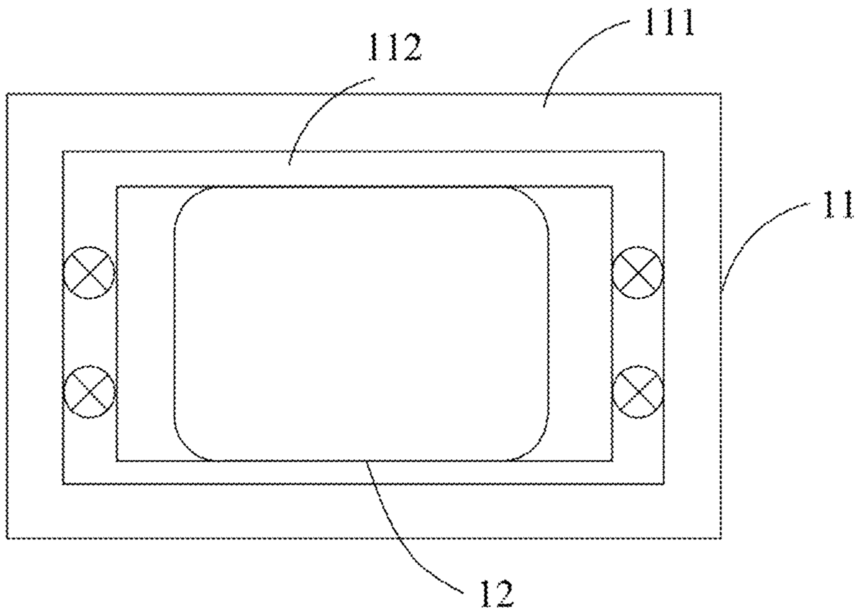
FIG. 6 is a schematic top view of a partial structure of a display panel according to yet another embodiment of the present disclosure.

Reference can be made to FIG. 6, which is a schematic top view of a partial structure of a display panel according to yet another embodiment of the present disclosure. The circuit board 11 includes a body portion 111 and a hollow portion 112. At least part of the first temperature sensor 12 is disposed opposite to the hollow portion 112. The first temperature sensor 12 is spaced apart from a surface of the circuit board 11 defining the hollow portion 112.

A metal routing of the circuit board 11 can be disposed on the body portion 111, and an IC chip can be carried on the body portion 111.

Optionally, the hollow portion 112 may be cuboid, trapezoidal, cylindrical, or other irregular shapes, which is not limited in the present disclosure.

Preferably, the hollow portion 112 may be defined close to an edge of the circuit board 11 and away from the IC chip, thereby reducing the influence of the operating temperature of the IC chip on the first temperature sensor 12.

Optionally, the first temperature sensor 12 may be connected to a circuit of the circuit board 11 through a solder ball, thereby transmitting the electrical signal.

The first temperature sensor 12 may be disposed opposite to or part of the first temperature sensor 12 may be disposed opposite to the hollow portion 112. The first temperature sensor 12 may be spaced apart from the hollow portion 112 or part of the first temperature sensor 12 may be accommodated in the hollow portion 112, and the first temperature sensor 12 is spaced apart from the surface of the circuit board 11 defining the hollow portion 112. Therefore, a surface of the first temperature sensor 12 can be more exposed to the environment, and the influence of the circuit board 11 on the first temperature sensor 12 can be reduced. Therefore, the first temperature sensor 12 can detect and feed back the ambient temperature more accurately, thereby improving the compensation accuracy for the driving voltage of the display panel 10, so that the display panel 10 can be applicable to more ambient temperatures, and safe and normal operation of the display panel 10 is ensured.

Referring to FIG. 1 and FIG. 2 again, a display device 1 is further provided in the present disclosure. The display device 1 includes a housing 20 and the display panel 10. The housing 20 is configured to accommodate the display panel 10.

Optionally, the housing 20 may be metal, alloy, plastic, or other materials, which is not limited in the present disclosure. The display panel 10 can be carried on and accommodated in the housing 20.

Optionally, the display device 1 may be, but is not limited to, a device having a display function, which is for a smart phone, a portable phone, a navigation device, a Television (TV), an in-vehicle head unit, a laptop computer, a tablet computer, a Portable Multimedia Player (PMP), a Personal Digital Assistant (PDA), and the like. It can be understood that a function type of the display device 1 may not be a limitation to the display device 1 provided in this implementation.

The display device 1 employs the display panel 10. In the display panel 10, the influence of the board temperature of the circuit board 11 on the first temperature sensor 12 is greatly reduced in terms of the physical structure, so that the ambient temperature detected and fed back to the control chip 13 by the first temperature sensor 12 less deviates from the actual ambient temperature. Meanwhile, in the display panel 10, the second temperature sensor 15 is adopted to detect the temperature change of the circuit board 11 and obtain the second temperature information. The second temperature information is compared with the first preset temperature, to correct the preset temperature-compensation-curve and obtain the first corrected temperature-compensation-curve. The first corrected temperature-compensation-curve is used for determining the compensation values required by the driving voltage at different ambient temperatures, to optimize the normal start-up and use of the display panel 10 at different ambient temperatures. Therefore, the burnout of the routing in the display panel 10 after the turn-on voltage, that is, the driving voltage, of the TFT in the display panel 10 is kept in the high voltage operating state or the failure of normal start-up at low temperature can be avoided. Further, the offset of the temperature-compensation-curve of the display panel 10 is reduced more effectively, thereby prolonging the service life of the display panel 10 and improving the safety and reliability of the display panel 10.

The terms of "embodiment" and "implementation" mentioned in the present disclosure means that the specific features, structures, or characteristics described with reference to the embodiments may be encompassed in at least one embodiment of the present disclosure. The phrase at various locations in the specification does not necessarily refer to the same embodiment, or an independent or alternative embodiment exclusive of another embodiment. Those skilled in the art may understand explicitly and implicitly that the embodiments described in the present disclosure may be combined with other embodiments. In addition, it may also be understood that the features, structures or characteristics described in the embodiments of the present disclosure may be combined as desired to obtain embodiments without departing from the spirit and scope of the technical solution of the present disclosure if there is no contradiction between the embodiments.

Finally, it may be noted that the above implementations are merely used for illustrating rather than limiting the technical solutions of the present disclosure; and although the present disclosure has been described in detail with reference to the preferred implementations, those skilled in the art may understand that modifications or equivalent substitutions may be made to the technical solutions of the present disclosure without departing from the spirit and scope of the technical solutions of the present disclosure.

What is claimed is:

1. A display panel, comprising:

a circuit board;

a first temperature sensor spaced apart from the circuit board, wherein the first temperature sensor is configured to detect an ambient temperature change and obtain first temperature information;

a control chip configured to receive the first temperature information, and output a control signal according to the first temperature information and a preset temperature-compensation-curve;

a driver chip configured to output a driving voltage under the control of the control signal, wherein the driving voltage is used for driving the display panel for image display;

a second temperature sensor configured to detect a temperature change of the circuit board and obtain second temperature information; and a backlight module, wherein the second temperature sensor comprises:

a first sub-sensor configured to detect the temperature change of the circuit board and obtain the second temperature information; and a second sub-sensor configured to detect a temperature change of the backlight module and obtain third temperature information, wherein the control chip is configured to compare the third temperature information with a second preset temperature, and when the third temperature information deviates from the second preset temperature, the control chip is configured to correct the first corrected temperature-compensation-curve and obtain a second corrected temperature-compensation-curve, wherein the second corrected temperature-compensation-curve is used for determining compensation values required by the driving voltage at different ambient temperatures, and wherein the control chip is configured to compare the second temperature information with a first preset temperature, and when the second temperature information deviates from the first preset temperature, the control chip is configured to correct the preset temperature-compensation-curve and obtain a first corrected temperature-compensation-curve, wherein the first corrected temperature-compensation-curve is used for determining compensation values required by the driving voltage at different ambient temperatures.

2. The display panel of claim 1, wherein the control chip is configured to obtain the first corrected temperature-compensation-curve according to a voltage-signal value and the preset temperature-compensation-curve, and wherein the voltage-signal value is obtained according to a voltage-signal value, and the voltage-signal value is obtained based on a magnitude of a driving voltage output by the driver chip.

3. The display panel of claim 1, wherein the control chip is configured to adjust display brightness of different frames displayed on the display panel, output a first pulse-signal having a first duty ratio when the display panel displays a first frame, output a second pulse-signal having a second duty ratio when the display panel displays a second frame, calculate a temperature change of the backlight module and obtain fourth temperature information in response to the output first pulse-signal, compensate the driving voltage according to the fourth temperature information, calculate a temperature change of the backlight module and obtain fifth temperature information in response to the output second pulse-signal, and compensate the driving voltage according to the fifth temperature information.

4. The display panel of claim 1, further comprising a heat insulation member and a connecting member, wherein the heat insulation member is disposed on a circuit board, and the first temperature sensor is carried on the heat insulation member at one side of the heat insulation member away from the circuit board, the connecting member is disposed at a peripheral side of the heat insulation member, one end of the connecting member is electrically connected to the first temperature sensor, the other end of the connecting member is electrically connected to the circuit board, and the connecting member is configured for electrical-signal transmission between the first temperature sensor and the circuit board.

5. The display panel of claim 4, wherein the heat insulation member comprises a plurality of heat insulation sub-members, the plurality of heat insulation sub-members cooperatively carry the first temperature sensor, and the plurality of heat insulation sub-members abut against each other.

6. The display panel of claim 4, wherein the connecting member has a first connecting surface and a second connecting surface that are connected in a bending manner, the first connecting surface is attached to the circuit board, and at least part of the second connecting surface is attached to the first temperature sensor.

7. The display panel of claim 4, wherein the heat insulation member is made of Expanded Polypropylene (EPP).

8. The display panel of claim 4, wherein the connecting member is made of a tin-containing material.

9. The display panel of claim 1, wherein the circuit board comprises a body portion and a hollow portion, at least part of the first temperature sensor is disposed opposite to the hollow portion, and the first temperature sensor is spaced apart from a surface of the circuit board defining the hollow portion.

10. A display device, comprising a housing and a display panel, wherein the display panel comprises:

a circuit board;

a first temperature sensor spaced apart from the circuit board, wherein the first temperature sensor is configured to detect an ambient temperature change and obtain first temperature information;

a control chip configured to receive the first temperature information, and output a control signal according to the first temperature information and a preset temperature-compensation-curve;

a driver chip configured to output a driving voltage under the control of the control signal, wherein the driving voltage is used for driving the display panel for image display;

a second temperature sensor configured to detect a temperature change of the circuit board and obtain second temperature information; and a heat insulation member and a connecting member, wherein the heat insulation member is disposed on a circuit board, and the first temperature sensor is carried on the heat insulation member at one side of the heat insulation member away from the circuit board, the connecting member is disposed at a peripheral side of the heat insulation member, one end of the connecting member is electrically connected to the first temperature sensor, the other end of the connecting member is electrically connected to the circuit board, and the connecting member is configured for electrical-signal transmission between the first temperature sensor and the circuit board;

wherein the control chip is configured to compare the second temperature information with a first preset temperature, and when the second temperature information deviates from the first preset temperature, the control chip is configured to correct the preset temperature-compensation-curve and obtain a first corrected temperature-compensation-curve, wherein the first corrected temperature-compensation-curve is used for determining compensation values required by the driving voltage at different ambient temperatures; and wherein the housing is configured to accommodate the display panel.

11. The display device of claim 10, wherein the display panel further comprises a backlight module, and the second temperature sensor comprises:

a first sub-sensor configured to detect the temperature change of the circuit board and obtain the second temperature information; and a second sub-sensor configured to detect a temperature change of the backlight module and obtain third temperature information; wherein the control chip is configured to compare the third temperature information with a second preset temperature, and when the third temperature information deviates from the second preset temperature, the control chip is configured to correct the first corrected temperature-compensation-curve and obtain a second corrected temperature-compensation-curve, wherein the second corrected temperature-compensation-curve is used for determining compensation values required by the driving voltage at different ambient temperatures.

12. The display device of claim 10, wherein the control chip is configured to obtain the first corrected temperature-compensation-curve according to a voltage-signal value and the preset temperature-compensation-curve, wherein the voltage-signal value is obtained according to a voltage-signal value, and the voltage-signal value is obtained based on a magnitude of a driving voltage output by the driver chip.

13. The display device of claim 11, wherein the control chip is configured to adjust display brightness of different frames displayed on the display panel, output a first pulse-signal having a first duty ratio when the display panel displays a first frame, output a second pulse-signal having a second duty ratio when the display panel displays a second frame, calculate a temperature change of the backlight module and obtain fourth temperature information in response to the output first pulse-signal, compensate the driving voltage according to the fourth temperature information, calculate a temperature change of the backlight module and obtain fifth temperature information in response to the output second pulse-signal, and compensate the driving voltage according to the fifth temperature information.

14. The display device of claim 10, wherein the heat insulation member comprises a plurality of heat insulation sub-members, the plurality of heat insulation sub-members cooperatively carry the first temperature sensor, and the plurality of heat insulation sub-members abut against each other.

15. The display device of claim 10, wherein the connecting member has a first connecting surface and a second connecting surface that are connected in a bending manner, the first connecting surface is attached to the circuit board, and at least part of the second connecting surface is attached to the first temperature sensor.

16. The display device of claim 10, wherein the heat insulation member is made of Expanded Polypropylene (EPP).

17. The display device of claim 10, wherein the connecting member is made of a tin-containing material.

18. The display device of claim 10, wherein the circuit board comprises a body portion and a hollow portion, at least part of the first temperature sensor is disposed opposite to the hollow portion, and the first temperature sensor is spaced apart from a surface of the circuit board defining the hollow portion.

* * * * *